(12) United States Patent
Zhang et al.

(10) Patent No.: US 9,344,225 B2
(45) Date of Patent: May 17, 2016

(54) DISTRIBUTED ARQ FOR WIRELESS COMMUNICATION SYSTEM

(71) Applicant: Apple Inc., Cupertino, CA (US)

(72) Inventors: Hang Zhang, Nepean (CA); Peiying Zhu, Kanata (CA); Wen Tong, Ottawa (CA)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/182,075

(22) Filed: Feb. 17, 2014

(65) Prior Publication Data

US 2014/0169267 A1    Jun. 19, 2014

Related U.S. Application Data

(63) Continuation of application No. 12/922,486, filed as application No. PCT/IB2009/000515 on Mar. 13, 2009, now Pat. No. 8,654,699.

(60) Provisional application No. 61/036,828, filed on Mar. 14, 2008.

(51) Int. Cl.
*H04B 7/14* (2006.01)
*H04L 1/18* (2006.01)
*H04W 8/30* (2009.01)
(Continued)

(52) U.S. Cl.
CPC .. *H04L 1/18* (2013.01); *H04B 7/15* (2013.01); *H04W 8/30* (2013.01); *H04W 40/22* (2013.01)

(58) Field of Classification Search
CPC .......... H04L 1/18; H04W 8/30; H04W 40/22; H04B 7/15

USPC .................... 370/315, 331; 714/748
See application file for complete search history.

(56) References Cited

U.S. PATENT DOCUMENTS

| 5,699,367 A | 12/1997 | Haartsen |
| 7,839,858 B2 | 11/2010 | Wiemann et al. |
| 8,149,757 B2 * | 4/2012 | Zheng et al. ................. 370/315 |

(Continued)

FOREIGN PATENT DOCUMENTS

| JP | 2005101727 | 4/2005 |
| JP | 2005223697 | 8/2005 |

(Continued)

OTHER PUBLICATIONS

Official Decision of Grant from Japanese Patent Application No. 2010-550281, mailed Jan. 21, 2014, English and Japanese versions, pp. 1-4.

(Continued)

*Primary Examiner* — Phuc Tran
(74) *Attorney, Agent, or Firm* — Meyertons, Hood, Kivlin, Kowert & Goetzel, P.C.

(57) ABSTRACT

Systems and methods for providing distributed Automatic Repeat Request (ARQ) in a wireless communication system are described herein. In one embodiment, a relay station interconnects a base station of the wireless communication system and one or more mobile stations. A first ARQ process is performed for a first connection between the base station and the relay station. A separate second ARQ process is performed for a second connection between the relay station and a mobile station. In this manner, rather than having end-to-end ARQ between the base station and the mobile station, a distributed ARQ process is provided.

22 Claims, 13 Drawing Sheets

(51) Int. Cl.
*H04W 40/22* (2009.01)
*H04B 7/15* (2006.01)

(56) References Cited

U.S. PATENT DOCUMENTS

| | | | |
|---|---|---|---|
| 8,239,719 B2* | 8/2012 | Shen et al. | 714/748 |
| 8,300,570 B2 | 10/2012 | Zhang et al. | |
| 2006/0146753 A1 | 7/2006 | Park et al. | |
| 2007/0049316 A1 | 3/2007 | Beming et al. | |
| 2007/0081492 A1 | 4/2007 | Petrovic et al. | |
| 2007/0190933 A1 | 8/2007 | Zheng et al. | |
| 2007/0293226 A1 | 12/2007 | Lee et al. | |
| 2008/0049718 A1* | 2/2008 | Chindapol et al. | 370/351 |
| 2008/0062944 A1 | 3/2008 | Smith et al. | |
| 2008/0117877 A1 | 5/2008 | Min et al. | |
| 2009/0213778 A1 | 8/2009 | Tao et al. | |

FOREIGN PATENT DOCUMENTS

| | | |
|---|---|---|
| JP | 2005341300 | 12/2005 |
| JP | 2006066948 | 3/2006 |
| WO | 9724829 | 7/1997 |
| WO | 9724829 A1 | 7/1997 |
| WO | 2005008947 A1 | 1/2005 |
| WO | 2006024321 A1 | 3/2006 |
| WO | 2006027849 | 3/2006 |
| WO | 2007083219 | 7/2007 |
| WO | 2007095966 A1 | 8/2007 |
| WO | 2007139338 | 12/2007 |

OTHER PUBLICATIONS

Translation of Office Action in related Japanese Application No. 2011-550281, Apr. 16, 2013, pp. 1-2.
International Search Report for International Patent Application No. PCT/182009/000515, mailed Jul. 16, 2009.
"Distributed ARQ", IEEE 802.16 Broadband Wireless Access Working Group, Zhang H. et al., Nortel, Mar. 15, 2008.
U.S. Appl. No. 12/922,486, filed Oct. 25, 2010, Hang Zhang.
Office Action from Japanese Application No. 201429678, mailed Oct. 14, 2014, English and Japanese versions, pp. 1-15.
Office Action from Korean Application No. 1020107022934, issued Mar. 27, 2015, English and Korean versions, pp. 1-13.
Extended search report, European Application No. 09719704.0-1854, mailed May 22, 2015, 6 pages.
Masaharu Komatsu, "Simple Go-Back-N ARQ Scheme for Satellite Channels with Double Acknowledgments", May 1, 1991, Electronics & Communications in Japan, Part I—Communications, Wiley, Hoboken, NJ, US, pp. 55-61, XP000274084, ISSN: 8756-6621.

* cited by examiner

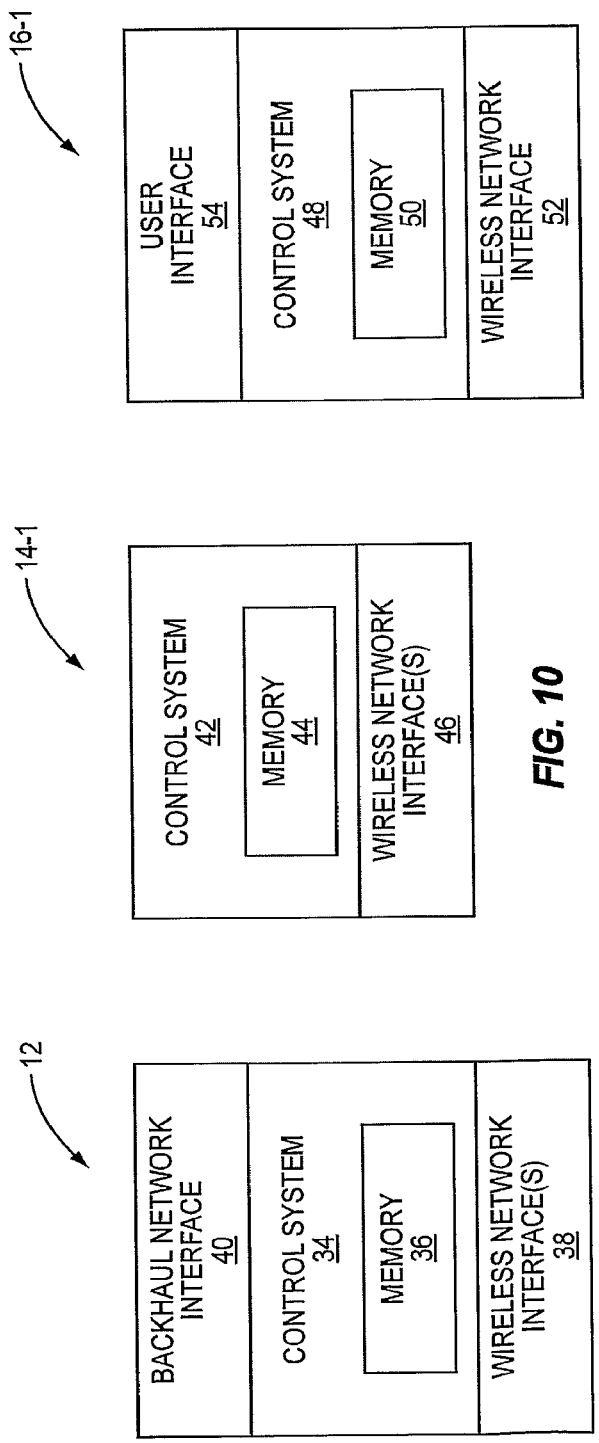

DISTRIBUTED ARQ FOR WIRELESS COMMUNICATION SYSTEM

This application is a continuation of U.S. patent application Ser. No. 12/922,486 filed Oct. 25, 2010, which itself claims benefit of U.S. provisional patent application No. 61/036,828 filed Mar. 14, 2008, the disclosures of both of which are hereby incorporated by reference in their entirety.

FIELD OF THE DISCLOSURE

The present invention relates to a wireless communication system and more particularly relates to distributed Automatic Repeat Request (ARQ) in a wireless communication system.

BACKGROUND

A relay station is a device that is used to interconnect a base station and a mobile station in a wireless communication network. By using a relay station, a base station may cover areas that would otherwise be inaccessible to the base station, such as the interior of a shopping center. Automatic Repeat Request (ARQ) is an error control process to achieve reliable data transmission over en unreliable connection. An ARQ process is desired for a wireless communication network having both base stations and relay stations.

SUMMARY OF THE DETAILED DESCRIPTION

Systems and methods for providing distributed Automatic Repeat Request (ARQ) in a wireless communication system are described herein. In one embodiment, a relay station interconnects a base station of the wireless communication system and one or more mobile stations. A first ARQ process is performed for a first connection between the base station and the relay station. A separate second ARQ process is performed for a second connection between the relay station and a mobile station. In this manner, rather than having end-to-end ARQ between the base station and the mobile station, a distributed ARQ process is provided.

In addition, systems and methods for maintaining ARQ continuity during a handover from the relay station to a target station are disclosed herein. In general, when a mobile station initiates a handover from the relay station providing distributed ARQ to a target station, the relay station forwards ARQ context information to the target station for an ARQ enabled connection between the relay station and the mobile station. More specifically, in one embodiment, if the target station is the base station serving the relay station, the relay station forwards the ARQ context information to the base station. Then, by using the ARQ context information, the base station is enabled to continue the ARQ process for the ARQ enabled connection to the mobile station.

In another embodiment, if the target station is second relay station served by the base station, the relay station forwards the ARQ context information to the base station. Then, if the second relay station is operating in a distributed ARQ mode or otherwise enabled to provide distributed ARQ, the base station forwards the ARQ context information to the second relay station. By using the ARQ context information, the second relay station is then enabled to continue the ARQ process for the ARQ enabled connection with the mobile station. If the second relay station is not operating in a distributed ARQ mode or otherwise enabled to provide distributed ARQ, the base station is enabled to continue the ARQ process for the ARQ enabled connection with the mobile station via the second relay station in an end-to-end, rather than distributed, manner.

In another embodiment, if the target station is a second base station, the relay station forwards the ARQ context information to the base station. The base station then forwards the ARQ context information to the second base station via a backhaul network. Then, by using the ARQ context information, the second base station is enabled to continue the ARQ process for the ARQ enabled connection with the mobile station.

In another embodiment, if the target station is a relay station of a second base station, the relay station forwards the ARQ context information to the base station, which in turn forwards the ARQ context information to the second base station. Then, if the second relay station is operating in a distributed ARQ mode or otherwise enabled to provide distributed ARQ, the second base station forwards the ARQ context information to the second relay station. By using the ARQ context information, the second relay station is then enabled to continue the ARQ process for the ARQ enabled connection with the mobile station. If the second relay station is not operating in a distributed ARQ mode or otherwise enabled to provide distributed ARQ, the second base station is enabled to continue the ARQ process for the ARQ enabled connection with the mobile station via the second relay station in an end-to-end, rather than distributed, manner.

Those skilled in the art will appreciate the scope of the present invention and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the invention, and together with the description serve to explain the principles of the invention.

FIG. 9 is a block diagram of an exemplary embodiment of the base station of FIG. 1;

FIG. 10 is a block diagram of an exemplary embodiment of the relay station of FIG. 1; and FIG. 11 is a block diagram of an exemplary embodiment of one of the mobile stations of FIG. 1.

DETAILED DESCRIPTION

The embodiments set forth below represent the necessary information to enable those skilled in the art to practice the invention and illustrate the best mode of practicing the invention. Upon reading the following description in light of the accompanying drawings, those skilled in the art will understand the concepts of the invention and will recognize applications of these concepts not particularly addressed herein. It should be understood that these concepts and applications fall within the scope of the disclosure and the accompanying claims.

Figure 1:
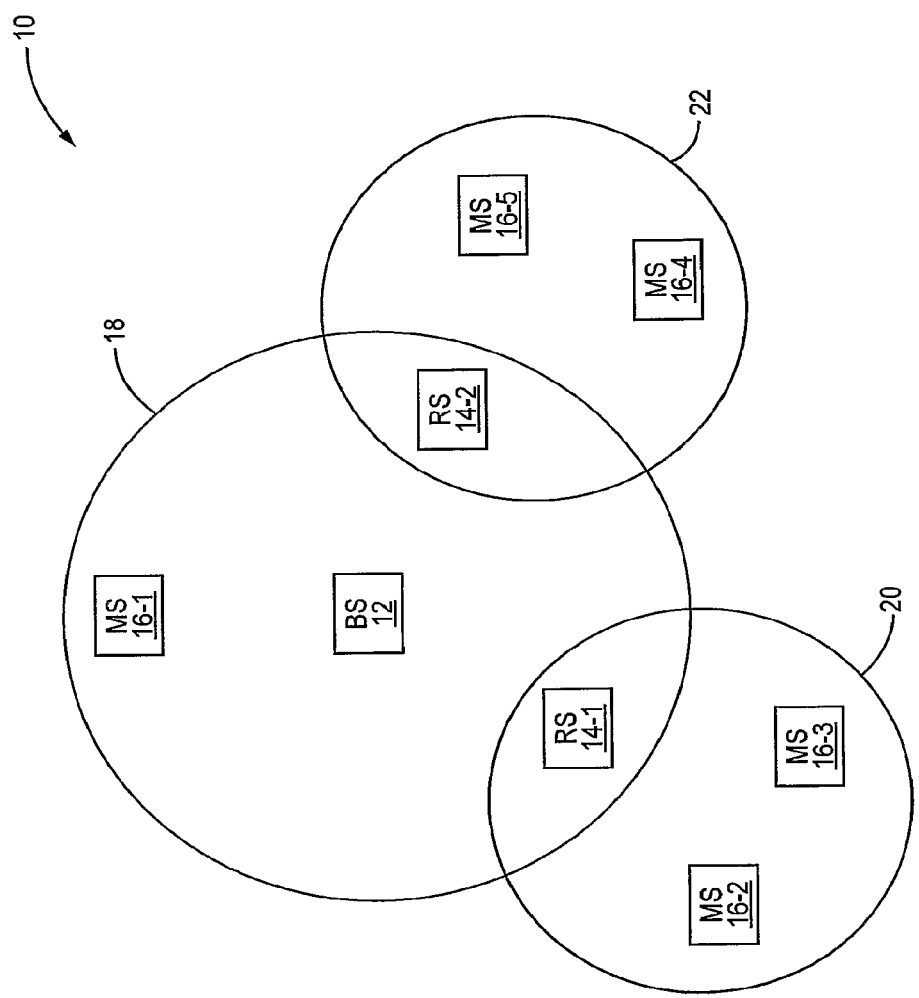
FIG. 1 is a block diagram of a wireless communication network including a base station, a relay station, and a number of mobile stations according to one embodiment of this disclosure.

FIG. 1 illustrates an exemplary topology of a wireless communication network 10. In the preferred embodiment, the wireless communication network 10 operates according to the IEEE 802.16j standard or the advanced Long Term Evolution (LTE) standard. However, the embodiments discussed herein may be utilized in any type of wireless communication system and are not limited to the IEEE 802.16j or advanced LTE standard. As illustrated, the wireless communication network 10 includes a base station (138) 12, a number of relay stations (RSs) 14-1 and 14-2, and a number of mobile stations (MSs) 16-1 through 16-5. The base station 12 is generally implemented at a fixed location. The base station 12 operates as a wireless access point for mobile stations, such as the mobile station 16-1, located within a wireless coverage area 18 of the base station 12 as well as for mobile stations, such as the mobile stations 16-2 through 16-5 located within wireless coverage areas 20 and 22 of the relay stations 14-1 and 14-2.

The relay stations 14-1 and 14-2 may each be either a fixed relay station (i.e., a relay station having a fixed location) or a mobile relay station (i.e., a relay station having a changing location). For instance, the relay station 14-1 may be a fixed relay station implemented at a shopping center in order to provide wireless access to mobile stations, such as the mobile stations 16-2 and 16-3, located within the shopping center, and the relay station 14-2 may be a mobile relay station implemented on a bus in order to provide wireless access to mobile stations, such as the mobile stations 16-4 and 16-5, located within the bus. In the preferred embodiment, each of the relay stations 14-1 and 14-2 may operate in either an end-to-end mode, which may also be referred to herein as a relay station mode, or a distributed mode, which may also be referred to herein as a base station mode. The operation modes of the relay stations 14-1 and 14-2 may be configured during a network entry. In an alternative embodiment, the relay stations 14-1 and 14-2 may have a single mode of operation, which may be either an end-to-end mode or a distributed mode, where at least one of the relay stations 14-1 and 14-2 is a distributed mode relay station. Note that the details of the end-to-end and distributed modes are discussed below in detail.

The mobile stations 16-1 through 16-5 may each be a user device having a wireless interface for connecting to the wireless communication network 10. For example, each of the mobile stations 16-1 through 16-5 may be a mobile telephone, a mobile smart phone, a wireless access card for a personal computer, or the like.

Figure 2:
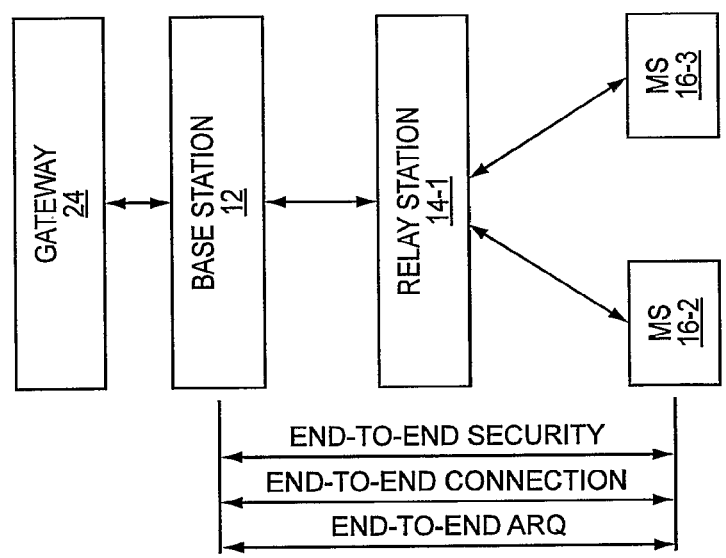
FIG. 2 illustrates an end-to-end mode of operation of a relay station according to one embodiment of this disclosure.

FIG. 2 illustrates the operation of the relay station 14-1 when operating in the end-to-end mode according to one embodiment of this disclosure. This discussion is equally applicable to the relay station 14-2. Also, while the discussion of FIG. 2 focuses on an exemplary embodiment where the wireless communication network 10 is an IEEE 802.16j network, one of ordinary skill in the art will readily appreciate that the relay station 14-1 operating in end-to-end mode may be utilized in other types of wireless communication networks upon reading this disclosure. In this embodiment, Internet protocol (IP) flow forwarded by a gateway 24 is received at the base station 12. The base station 12 maps the IP flow to a MS connection (i.e., a connection to one of the mobile stations 16-1 through 16-5). Using IEEE 802.16j as an example, the base station 12 creates an IEEE 802.16e medium access control (MAC) packet data unit (PDU) and may encrypt the MAC PDU. The base station 12 forwards the IEEE 802.16e MAC PDU as part of a relay MAC (R-MAC) PDU flow directed toward the relay station 14-1. The R-MAC PDU flow may include one or more IEEE 802.16e MAC PDUs. The relay station 14-1 receives the R-MAC PDU flow and directs packets destined toward the mobile station 16-2 to the mobile station 16-2 and directs packets destined toward the mobile station 16-3 to the mobile station 16-3 as IEEE 802.16e MAC PDU flow. If the MAC PDU flow is encrypted, the mobile stations 16-2 and 16-3 decrypt the IEEE 802.16e MAC PDU. Accordingly, end-to-end connectivity is maintained between the base station 12 and the mobile stations 16-2 and 16-3 connected via the relay station 14-1. Additionally, end-to-end security and Automatic Repeat Request (ARQ) are maintained between the base station 12 and the mobile stations 16-2 and 16-3 connected via the relay station 14-1.

Figure 3:
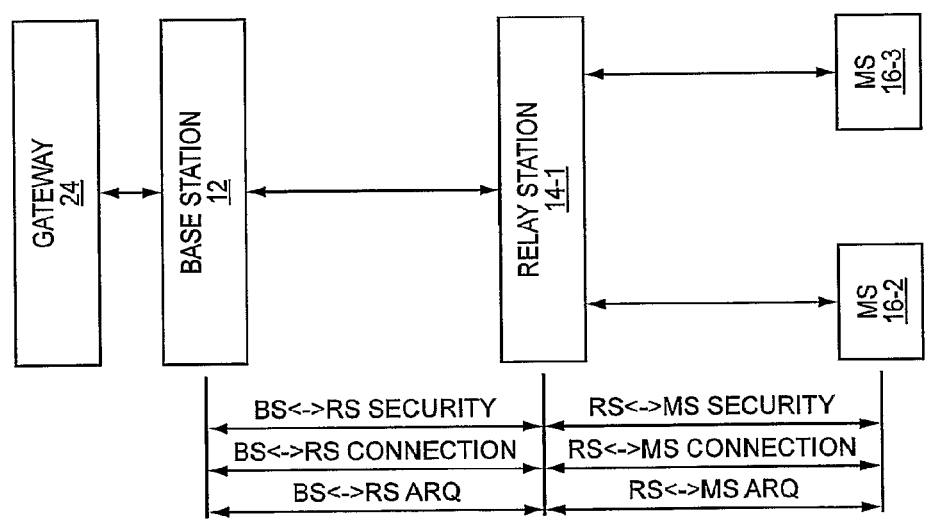
FIG. 3 illustrates a distributed mode of operation of a relay station according to one embodiment of this disclosure.

FIG. 3 illustrates the operation of the relay station 14-1 when operating in the distributed mode according to one embodiment of this disclosure. This discussion is equally applicable to the relay station 14-2. Also, while the discussion of FIG. 3 focuses on an exemplary embodiment where the wireless communication network 10 is an IEEE 802.16j network, one of ordinary skill in the art will readily appreciate that the relay station 14-1 operating in distributed mode may be utilized in other types of wireless communication networks upon reading this disclosure. In this embodiment, a transport connection is established between the base station 12 and the relay station 14-1 that is dedicated for relaying mobile station traffic, which is traffic to and/or from the mobile stations 16-2 and 16-3 served by the relay station 14-1. Connections are also established between the relay station 14-1 and the mobile stations 16-2 and 16-3. Using a downlink as an example, the base station 12 maps downlink service data flows to the mobile stations 16-2 and 16-3 served by the relay station 14-1 to the transport connection of the relay station 14-1. The relay station 14-1 maps the downlink service data flows from the base station 12 to the respective connections of the mobile stations 16-2 and 16-3. In a similar manner, uplink service data flows from the mobile stations 16-2 and 16-3 are provided to the relay station 14-1 via the corresponding connections, and the relay station 14-1 maps the uplink service data flows from the mobile stations 16-2 and 16-3 to the transport connection to the base station 12. As such, security, connectivity, and ARQ may be maintained between the base station 12 and the relay station 14-1, and separately maintained between the relay station 14-1 and mobile stations 16-2 and 16-3.

Specifically, with respect to ARQ, an ARQ process is performed by the base station 12 and the relay station 14-1 for the transport connection dedicated for relaying mobile station traffic. In addition, if one or more ARQ enabled connections are made between the relay station 14-1 and the mobile station 16-2, a separate ARQ process is performed by the relay station 14-1 and the mobile station 16-2 for each of the ARQ enabled connections. Likewise, if one or more ARQ enabled connections are made between the relay station 14-1 and the mobile station 16-3, a separate ARQ process is performed by the relay station 14-1 and the mobile station 16-3 for each of the ARQ enabled connections. In this manner, rather than having an end-to-end ARQ process between the base station 12 and each of the mobile stations 16-2 and 16-3, ARQ is distributed in that an ARQ process is performed for the transport connection between the base station 12 and the relay station 14-1 and separate ARQ processes are performed between the relay station 14-1 and the mobile stations 16-2 and 16-3.

Distributed ARQ is beneficial because it reduces overhead in the wireless communication network 10. More specifically, ARQ related data flow does not need to be relayed between the base station 12 and the mobile stations 16-1 through 16-5 for each ARQ enabled connection of the mobile stations 16-1 through 16-5. In addition, there is reduced delay for distributed ARQ as compared to end-to-end ARQ. In addition, distributed ARQ is particularly beneficial for mobile relay stations.

Figure 4:
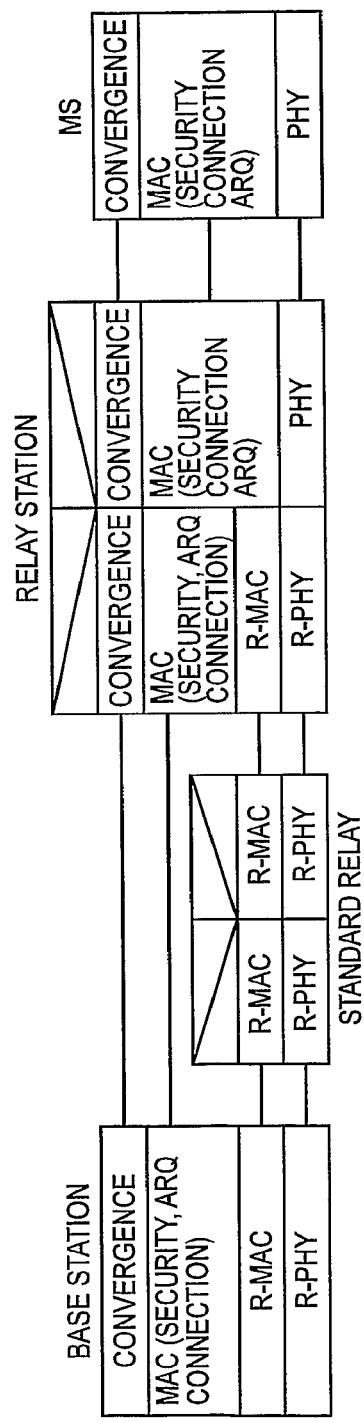
FIG. 4 illustrates exemplary protocol stacks of a base station, a relay station, and a mobile station when the relay station is operating in a distributed mode according to one embodiment of this disclosure.

FIG. 4 graphically illustrates an exemplary protocol stack for the base station 12, the relay station 14-1, and the mobile station 16-2. In addition, FIG. 4 illustrates an exemplary protocol stack of a standard relay primarily to be contrasted with the protocol stack of the relay station 14-1. As illustrated in FIG. 4, the base station 12 maintains a convergence layer and a MAC layer with the relay station 14-1, while the relay station 14-1 maintains a separate convergence layer and a separate MAC layer with the mobile station 16-2. The relay station 14-1 also maintains a physical (PHY) layer with the mobile station 16-2. In this example, the base station 12 also maintains a PHY layer and a MAC layer, which for IEEE 802.16 are an R-PHY layer and an R-MAC layer, with the standard relay. The standard relay also maintains a MAC layer and a PHY layer, which for IEEE 802.16 are an R-PHY layer and an R-MAC layer, with the relay station 14-1. Note that, as discussed above and illustrated in FIG. 4, the ARQ maintained between the base station 12 and the relay station 14-1 is separate from the ARQ maintained between the relay station 14-1 and the mobile station 16-2.

When operating to provide distributed ARQ, the relay stations 14-1 and 14-2 store ARQ context information for each of the ARQ enabled connections with the mobile stations 16-2 through 16-5. For a particular connection, the ARQ context information for that connection includes information defining the state of the ARQ process. As an example, for IEEE 802.16, the ARQ context information for a particular connection may include ARQ related variables such as ARQ_TX_WINDOW_START, ARQ_RX_HIGHEST_BST, and the like. Note, however, that the ARQ context information may vary depending on the particular implementation.

Using the mobile station 16-2 as an example, when the mobile station 16-2 performs a handover from the relay station 14-1 to a target station, the relay station 14-1, which is operating in the distributed ARQ mode, forwards the ARQ context information for each ARQ enabled connection of the mobile station 16-2 to the base station 12. The target station may be the base station 12, another relay station served by the base station 12 such as the relay station 14-2, another base station, or another relay station of another base station. Based on the forwarded ARQ context information, the target station is enabled to maintain the ARQ process for each of the ARQ enabled connections of the mobile station 16-2. As a result, continuity of the ARQ process for each of the ARQ enabled connections of the mobile station 16-2 is maintained through and following handover.

Figure 5A:
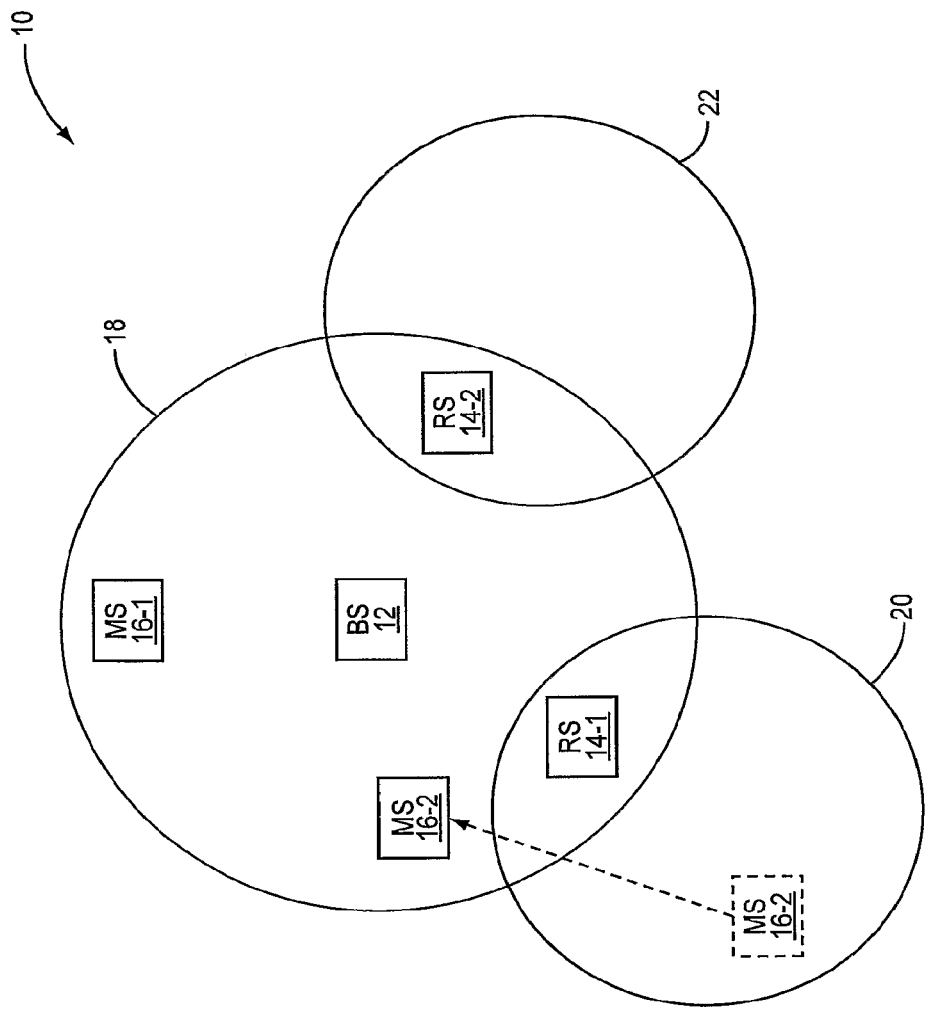
FIGS. 5A and 5B illustrate forwarding of Automatic Repeat Request (ARQ) context information from a relay station operating in a distributed mode when a handover of the mobile station from the relay station to a base station associated with the relay station occurs according to one embodiment of this disclosure.
Figure 5B:
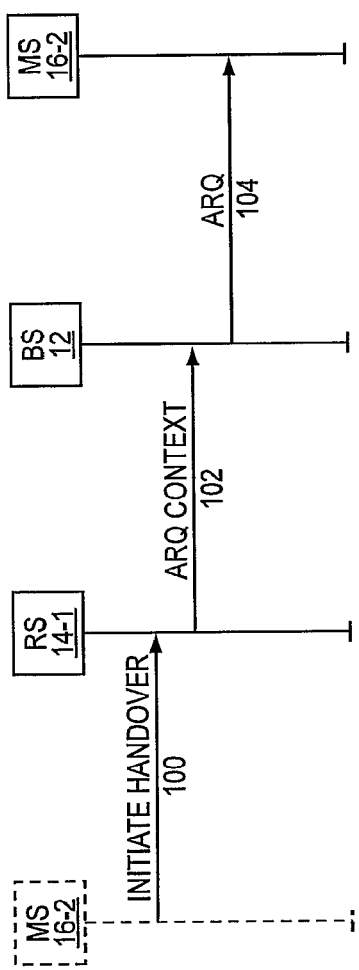

FIGS. 5A and 5B illustrate the forwarding of the ARQ context information for the mobile station 16-2 during handover of the mobile station 16-2 from the relay station 14-1 to the base station 12 according to one embodiment of this disclosure. As illustrated in FIG. 5A, in this embodiment, the mobile station 16-2 moves from the wireless coverage area 20 of the relay station 14-1 into the wireless coverage area 18 of the base station 12. In response, a handover process is performed, as will be appreciated by one of ordinary skill in the art upon reading this disclosure. As illustrated in FIG. 5B, once the handover process is initiated (step 100), the relay station 14-1 forwards the ARQ context information for one or more ARQ enabled connections to the mobile station 16-2 to the base station 12 (step 102). Based on the ARQ context information, the base station 12 is then enabled to continue the ARQ process for each of the ARQ enabled connections to the mobile station 16-2 (step 104). As a result, continuity for the ARQ process is maintained during and after the handover process. Note that FIG. 5B only illustrates the forwarding of the ARQ context information for clarity. However, as will be appreciated by one of ordinary skill in the art upon reading this disclosure, numerous additional steps not illustrated in FIG. 5B are typically performed during the handover process.

Figure 6A:
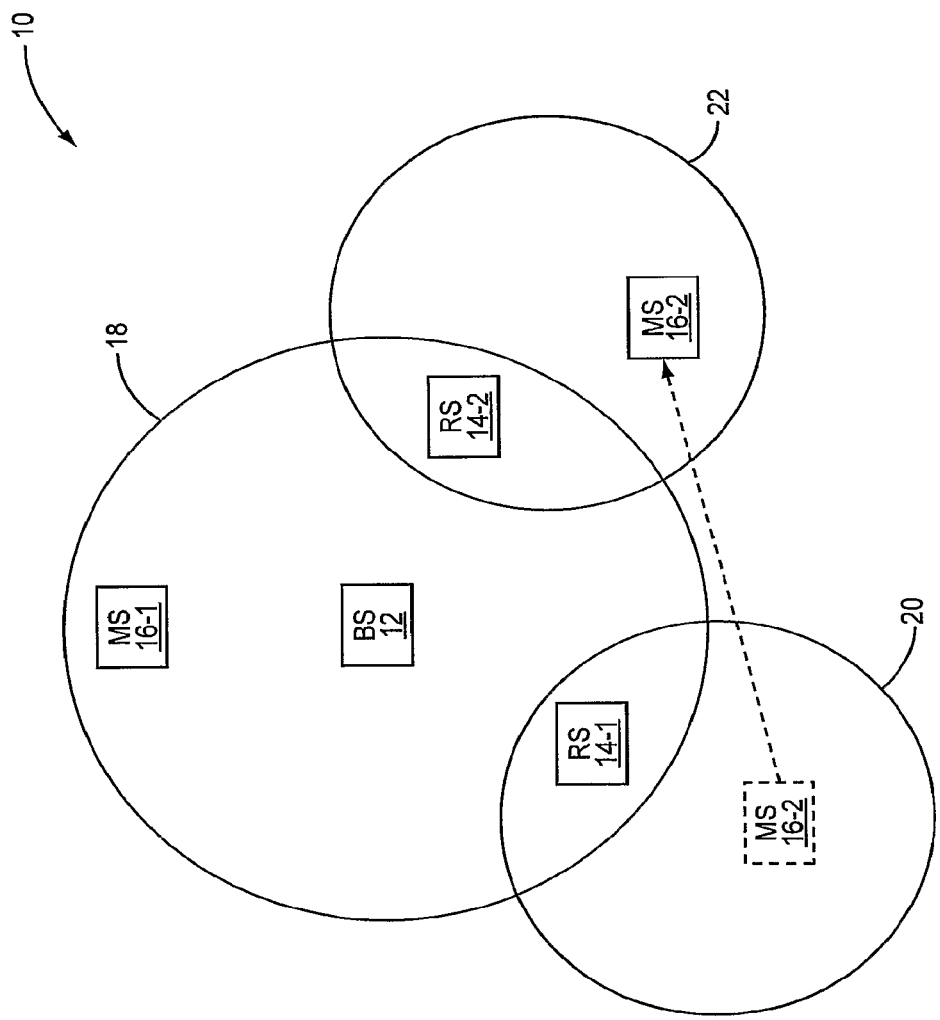
FIGS. 6A through 6C illustrate forwarding of ARQ context information from a relay station operating in a distributed mode when a handover of the mobile station from a relay station to another relay station associated with the same base station occurs according to one embodiment of this disclosure.
Figure 6B:
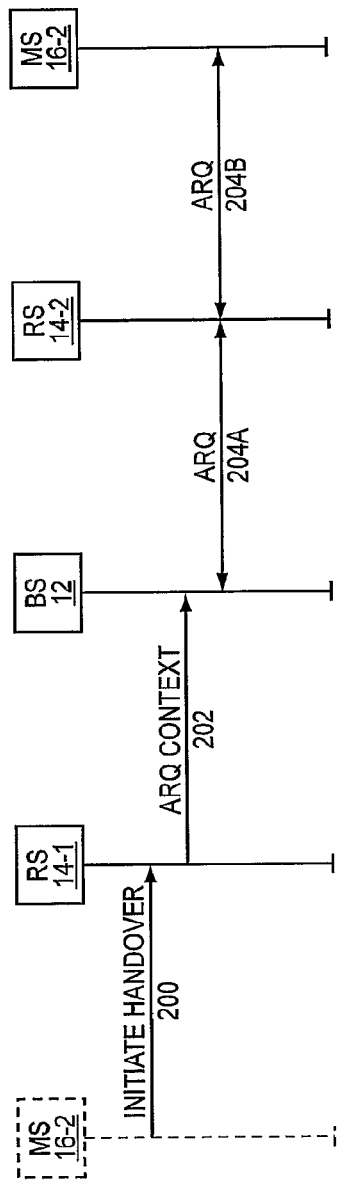
Figure 6C:
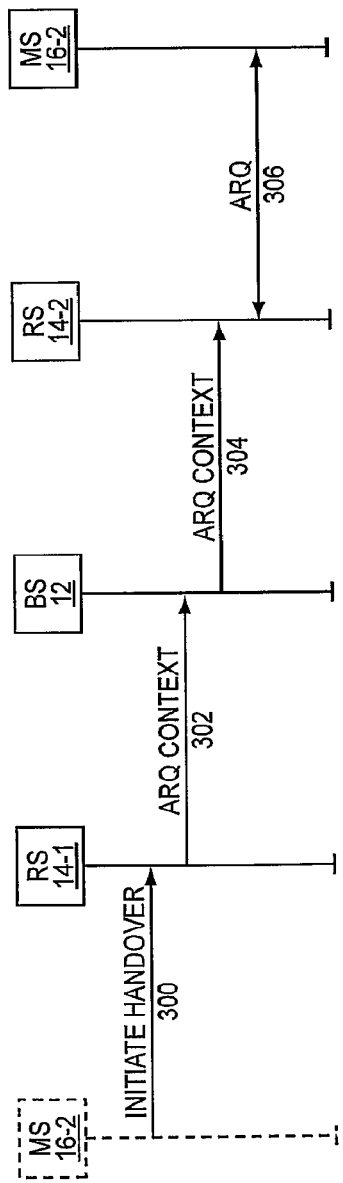

FIGS. 6A through 6C illustrate the forwarding of the ARQ context information for the mobile station 16-2 during handover of the mobile station 16-2 from the relay station 14-1 to the relay station 14-2 of the base station 12 according to one embodiment of this disclosure. As illustrated in FIG. 6A, in this embodiment, the mobile station 16-2 moves from the wireless coverage area 20 of the relay station 14-1 into the wireless coverage area 22 of the relay station 14-2. In response, a handover process is performed, as will be appreciated by one of ordinary skill in the art upon reading this disclosure. As illustrated in FIG. 6B, once the handover process is initiated (step 200), the relay station 14-1 forwards the ARQ context information for one or more ARQ enabled connections of the mobile station 16-2 to the base station 12 (step 202). In this embodiment, the relay station 14-2 operates in the end-to-end mode. As such, based on the ARQ context information, the base station 12 is then enabled to continue the ARQ process for each of the ARQ enabled connections to the mobile station 16-2 via the relay station 14-2 in an end-to-end manner (steps 204A/204B). As a result, continuity for the ARQ process is maintained during and after the handover process.

FIG. 6C illustrates the ARQ forwarding process if the relay station 14-2 operates in the distributed mode. As illustrated, once the handover process is initiated (step 300), the relay station 14-1 forwards the ARQ context information for one or more ARQ enabled connections of the mobile station 16-2 to the base station 12 (step 302). In this embodiment, the relay station 14-2 operates in the distributed mode. As such, the base station 12 forwards the ARQ context information to the relay station 14-2 (step 304). Then, based on the ARQ context information, the relay station 14-2 is then enabled to continue the ARQ process for each of the ARQ enabled connections to the mobile station 16-2 (step 306). As a result, continuity for the ARQ process is maintained during and after the handover process. Again, note that FIGS. 6B and 6C only illustrate the forwarding of the ARQ context information for clarity. However, as will be appreciated by one of ordinary skill in the art upon reading this disclosure, numerous additional steps not illustrated in FIGS. 6B and 6C are typically performed during the handover process.

Figure 7A:
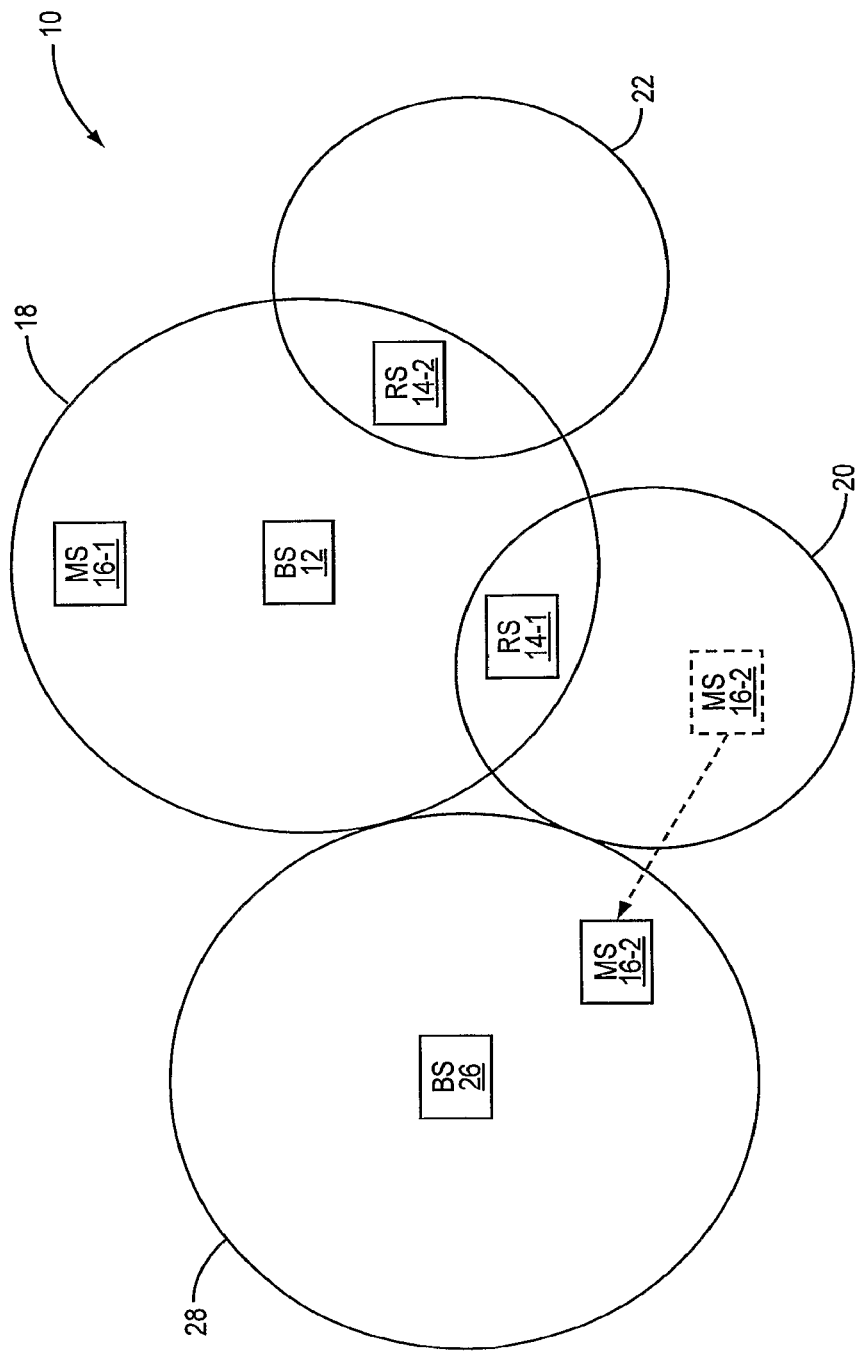
FIGS. 7A and 7B illustrate forwarding of ARQ context information from a relay station operating in a distributed mode when a handover of the mobile station from the relay station to a different base station occurs according to one embodiment of this disclosure.
Figure 7B:
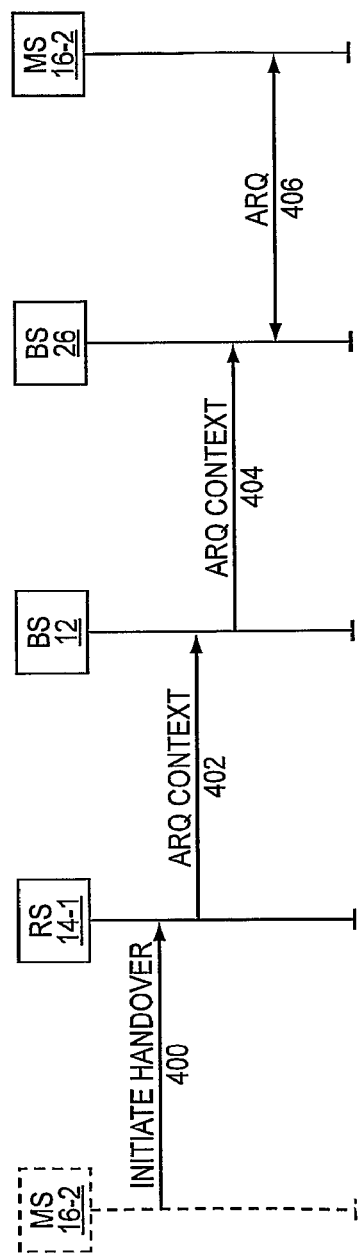

FIGS. 7A and 7B illustrate the forwarding of the ARQ context information for the mobile station 16-2 during handover of the mobile station 16-2 from the relay station 14-1 to a base station 26 other than the base station 12 according to one embodiment of this disclosure. As illustrated in FIG. 7A, in this embodiment, the mobile station 16-2 moves from the wireless coverage area 20 of the relay station 14-1 into a wireless coverage area 28 of the base station 26. In response, a handover process is performed, as will be appreciated by one of ordinary skill in the art upon reading this disclosure. As illustrated in FIG. 7B, once the handover process is initiated (step 400), the relay station 14-1 forwards the ARQ context information for one or more ARQ enabled connections of the mobile station 16-2 to the base station 12 (step 402). The base station 12 then forwards the ARQ context information to the base station 26 preferably via a backhaul network (step 404). Based on the ARQ context information, the base station 26 is then enabled to continue the ARQ process for each of the ARQ enabled connections to the mobile station 16-2 (step 406). As a result, continuity for the ARQ process is maintained during and after the handover process. Note that FIG. 7B only illustrates the forwarding of the ARQ context information for clarity. However, as will be appreciated by one of ordinary skill in the art upon reading this disclosure, numerous additional steps not illustrated in FIG. 7B are typically performed during the handover process.

Figure 8A:
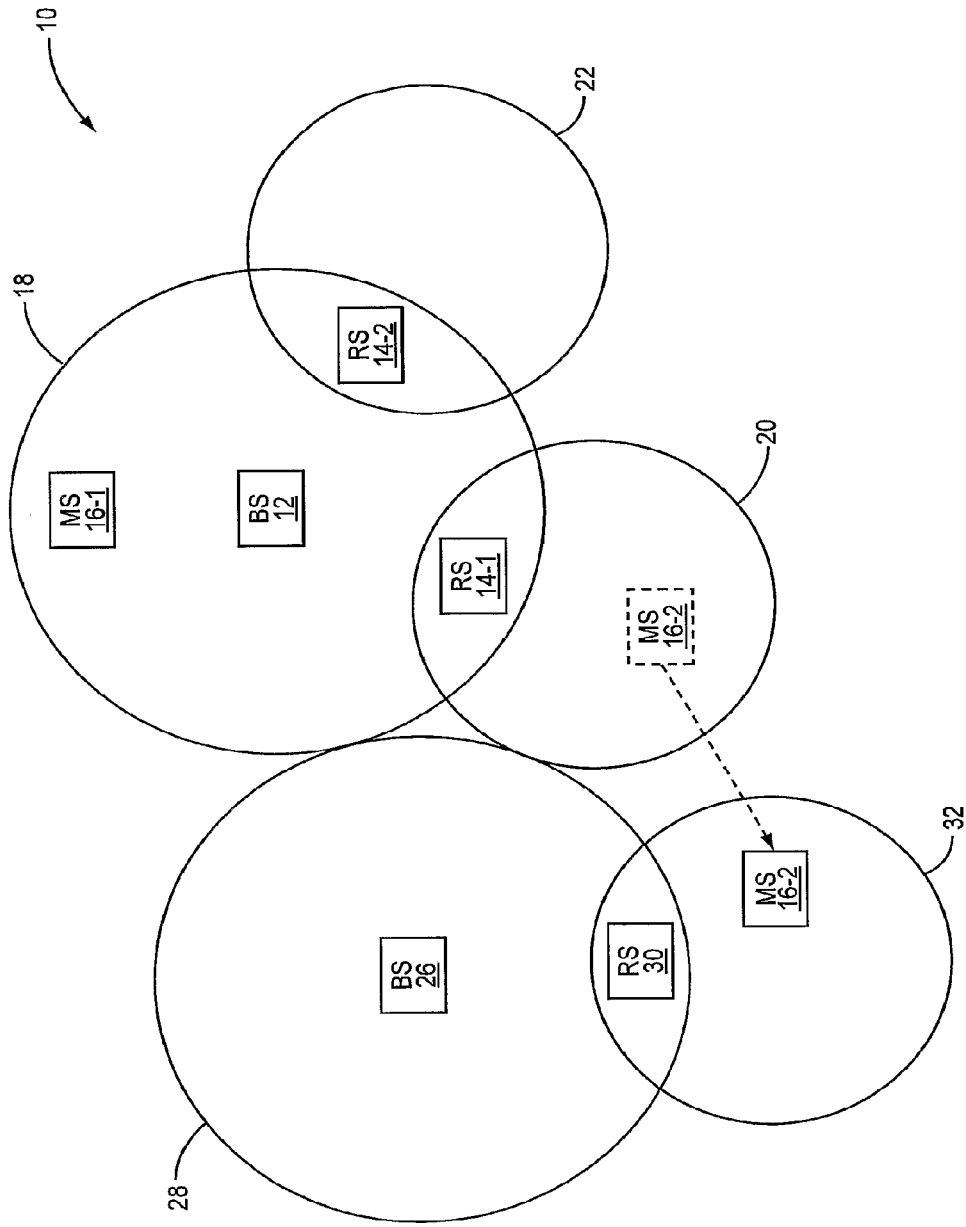
FIGS. 8A through 8C illustrate forwarding of ARQ context information from a relay station operating in a distributed mode when a handover of the mobile station from a relay station to another relay station associated with a different base station occurs according to one embodiment of this disclosure.
Figure 8B:
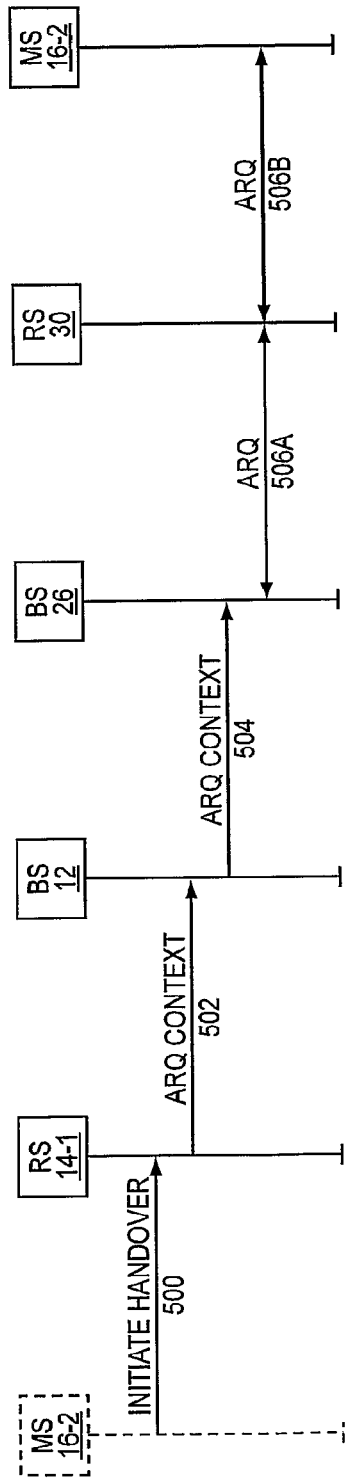
Figure 8C:
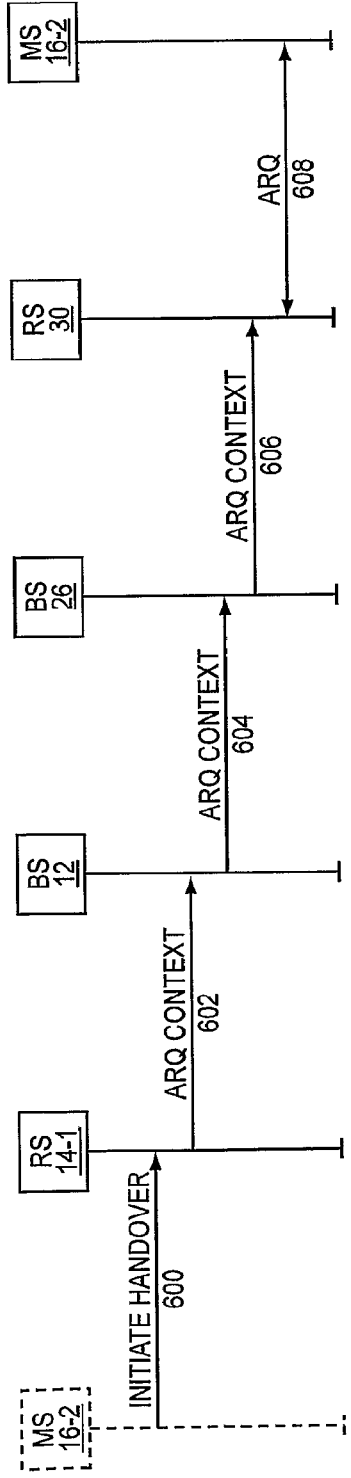

FIGS. 8A through 8C illustrate the forwarding of the ARQ context information for the mobile station 16-2 during handover of the mobile station 16-2 from the relay station 14-1 to a relay station 30 of the base station 26 according to one embodiment of this disclosure. As illustrated in FIG. 8A, in this embodiment, the mobile station 16-2 moves from the wireless coverage area 20 of the relay station 14-1 into a wireless coverage area 32 of the relay station 30. In response, a handover process is performed, as will be appreciated by one of ordinary skill in the art upon reading this disclosure. As illustrated in FIG. 8B, once the handover process is initiated (step 500), the relay station 14-1 forwards the ARQ context information for one or more ARQ enabled connections of the mobile station 16-2 to the base station 12 (step 502). The base station 12 then forwards the ARQ context information for the one or more ARQ enabled connections of the mobile station 16-2 to the base station 26 preferably via a backhaul network (step 504). In this embodiment, the relay station 30 operates in the end-to-end mode. As such, based on the ARQ context information, the base station 12 is then enabled to continue the ARQ process for each of the ARQ enabled connections to the mobile station 16-2 via the relay station 30 in an end-to-end manner (steps 506A/506B). As a result, continuity for the ARQ process is maintained during and after the handover process.

FIG. 8C illustrates the ARQ forwarding process if the relay station 30 operates in the distributed mode. As illustrated, once the handover process is initiated (step 600), the relay station 14-1 forwards the ARQ context information for one or more ARQ enabled connections of the mobile station 16-2 to the base station 12 (step 602). The base station 12 then forwards the ARQ context information for the one or more ARQ enabled connections of the mobile station 16-2 to the base station 26 preferably via a backhaul network (step 604). In this embodiment, the relay station 30 operates in the distributed mode. As such, the base station 12 forwards the ARQ context information to the relay station 30 (step 606). Then, based on the ARQ context information, the relay station 30 is enabled to continue the ARQ process for each of the ARQ enabled connections of the mobile station 16-2 (step 606). As a result, continuity for the ARQ process is maintained during and after the handover process. Again, note that FIGS. 8B and 8C only illustrate the forwarding of the ARQ context information for clarity. However, as will be appreciated by one of ordinary skill in the art upon reading this disclosure, numerous additional steps not illustrated in FIGS. 8B and 8C are typically performed during the handover process.

FIG. 9 is a block diagram of an exemplary embodiment of the base station 12 of FIG. 1. As illustrated, the base station 12 includes a control system 34, which may have associated memory 36. The control system 34 is implemented in hardware. For instance, the control system 34 may be one or more Central Processing Units (CPUs), one or more Application Specific Integrated Circuits (ASICs), one or more Field Programmable Gate Arrays (FPGAs), or the like. The functionality of the base station 12 discussed herein may be implemented in software executed by the control system 34, implemented in hardware within the control system 34, or a combination thereof. The base station 12 also includes one or more wireless network interfaces 38 for communicating with the relay stations 14-1 and 14-2 (FIG. 1) and mobile stations, such as the mobile station 16-1, located within the wireless coverage area 18 of the base station 12. Lastly, the base station 12 includes a backhaul network interface 40 for communicating with other base stations via a backhaul network. The backhaul network may be a high speed wired or wireless network.

FIG. 10 is a block diagram of an exemplary embodiment of the relay station 14-1 of FIG. 1. This discussion is equally applicable to the relay station 14-2. As illustrated, the relay station 14-1 includes a control system 42, which may have associated memory 44. The control system 42 is implemented in hardware. For instance, the control system 42 may be one or more CPUs, one or more ASICs, one or more FPGAs, or the like. The functionality of the relay station 14-1 discussed herein may be implemented in software executed by the control system 42, implemented in hardware within the control system 42, or a combination thereof. The relay station 14-1 also includes one or more wireless network interfaces 46 for communicating with the base station 12 and mobile stations, such as the mobile stations 16-2 and 16-3, located within the wireless coverage area 20 of the relay station 14-1.

FIG. 11 is a block diagram of an exemplary embodiment of the mobile station 16-1. This discussion is equally applicable to the other mobile stations 16-2 through 16-5. As illustrated, the mobile station 16-1 includes a control system 48, which may have associated memory 50. The control system 48 is implemented in hardware. For instance, the control system 48 may be one or more CPUs, one or more ASICs, one or more FPGAs, or the like. The functionality of the mobile station 16-1 discussed herein may be implemented in software executed by the control system 48, implemented in hardware within the control system 48, or a combination thereof. The mobile station 16-1 also includes a wireless network interface 52 for communicating with the base station 12. Note that if the mobile station 16-1 were to move to the wireless coverage area 20 of the relay station 14-1, then the wireless network interface 52 would then enable the mobile station 16-1 to communicate with the relay station 14-1. The mobile station 16-1 also includes a user interface 54, which may include components such as a speaker, a microphone, a display, a keypad, or the like.

Those skilled in the art will recognize improvements and modifications to the embodiments of the present invention. All such improvements and modifications are considered within the scope of the concepts disclosed herein and the claims that follow.

What is claimed is:

1. A mobile station for communicating in a wireless communication network, the mobile station comprising:
a wireless network interface configured to:
establish a first connection between a relay station and the mobile station within the wireless communication network, and communicate with the relay station over the first connection, wherein communication between the relay station and a base station is over a second connection established between the base station and the relay station within the wireless communication network; and
establish a third connection between a target station and the mobile station within the wireless communication network in response to a handover of the mobile station from the relay station to the target station, wherein, during the handover, context information that enables continuity of data flow for the mobile station at the target station is forwarded by the relay station; and
a control system comprising a first protocol stack having convergence, media access control (MAC) and physical (PHY) layers, wherein the control system is configured to perform, through the wireless network interface, a first ARQ process over the first connection according to at least the first protocol stack;
wherein communication by the relay station over the first connection is further according to a second protocol stack comprised in the relay station and having convergence, media access control (MAC) and physical (PHY) layers.

2. The mobile station of claim 1, wherein the relay station is one of:
a mobile relay station; or
a fixed relay station.

3. The mobile station of claim 1, further comprising:
a user interface interacting with the control system and comprising one or more of:
a speaker;
a microphone;
a display; or
a keypad.

4. The mobile station of claim 1, wherein a plurality of mobile stations, including the mobile station, are served by the relay station within the wireless communication network;
wherein the second connection is a transport connection for downlink data for the plurality of mobile stations; and
wherein a plurality of connections, including the first connection, to the plurality of mobile stations are maintained by the relay station, each of the plurality of connections being for one of the plurality of mobile stations and at least some of the plurality of connections being ARQ enabled.

5. The mobile station of claim 4, wherein a separate ARQ process is performed by the relay station for each of the plurality of connections that is ARQ enabled.

6. The mobile station of claim 1, wherein the target station is the base station, and wherein the control system is configured to initiate, through the wireless network interface, the handover of the mobile station from the relay station to the base station;
wherein the context information is communicated to the base station by the relay station for the first ARQ process, responsive to the control system initiating the handover of the mobile station from the relay station to the base station; and
wherein the first ARQ process is continued by the base station with the mobile station, responsive to the context information being communicated to the base station for the first ARQ process.

7. The mobile station of claim 1, wherein the target station is a second relay station that is associated with the base station and operates in an end-to-end ARQ mode, wherein the control system is configured to initiate, through the wireless network interface, the handover of the mobile station from the relay station to the second relay station;
wherein the context information is communicated to the base station by the relay station for the first ARQ process, responsive to the control system initiating the handover of the mobile station from the relay station to the second relay station; and
wherein the first ARQ process with the mobile station is continued by the base station via the second relay station in an end-to-end manner, responsive to the context information being communicated by the relay station to the base station for the first ARQ process.

8. The mobile station of claim 1, wherein the target station is a second relay station that is associated with the base station and operates in a distributed ARQ mode, wherein the control system is configured to initiate, through the wireless network interface, the handover of the mobile station from the relay station to the second relay station;
wherein the context information is communicated to the base station by the relay station for the first ARQ process, responsive to the control system initiating the handover of the mobile station from the relay station to the second relay station;
wherein the context information is forwarded by the base station to the second relay station for the first ARQ process, responsive to the context information being communicated by the relay station to the base station for the first ARQ process; and
wherein the first ARQ process with the mobile station is continued by the second relay station, responsive to the context information being forwarded by the base station to the second relay station for the first ARQ process.

9. The mobile station of claim 1, wherein the target station is a second base station, wherein the control system is configured to initiate, through the wireless network interface, the handover of the mobile station from the relay station to a second base station;
wherein the context information is communicated to the base station by the relay station for the first ARQ process, responsive to the control system initiating the handover of the mobile station from the relay station to the second base station;
wherein the context information is forwarded by the base station to the second base station for the first ARQ process, responsive to the context information being communicated by the relay station to the base station for the first ARQ process; and
wherein the first ARQ process with the mobile station is continued by the second base station, responsive to the context information being forwarded by the base station to the second base station for the first ARQ process.

10. The mobile station of claim 1, wherein the target station is a second relay station that is associated with a second base station and operates in an end-to-end ARQ mode, wherein the control system is configured to initiate, through the wireless network interface, the handover of the mobile station from the relay station to the second relay station;
   wherein the context information is communicated to the base station by the relay station for the first ARQ process, responsive to the control system initiating the handover of the mobile station from the relay station to the second relay station;
   wherein the context information is forwarded by the base station to the second base station for the first ARQ process, responsive to the context information being communicated by the relay station to the base station for the first ARQ process; and
   wherein the first ARQ process with the mobile station is continued by the second base station via the second relay station in an end-to-end manner, responsive to the context information being forwarded by the base station to the second base station for the first ARQ process.

11. The mobile station of claim 1, wherein the target station is a second relay station that is associated with a second base station and operates in a distributed ARQ mode, wherein the control system is configured to initiate, through the wireless network interface, the handover of the mobile station from the relay station to the second relay station;
   wherein the context information is communicated to the base station by the relay station for the first ARQ process, responsive to the control system initiating the handover of the mobile station from the relay station to the second relay station;
   wherein the context information is forwarded to the second base station by the base station for the first ARQ process, responsive to the context information being communicated to the base station by the relay station for the first ARQ process;
   wherein the context information is forwarded to the second relay station by the second base station for the first ARQ process, responsive to the context information being forwarded to the second base station by the base station for the first ARQ process; and
   wherein the first ARQ process with the mobile station is continued by the second relay station, responsive to the context information being forwarded to the second relay station by the second base station for the first ARQ process.

12. A relay station associated with a base station in a wireless communication network, the relay station comprising:
   wireless interface configured to communicate within the wireless communication network with a base station and one or more mobile stations; and
   a control system configured to:
      establish a first connection to the base station through the wireless interface according to at least a first protocol stack comprising convergence, media access control (MAC) and physical (PHY) layers;
      perform a first Automatic Repeat Request (ARQ) process for the first connection between the relay station and the base station through the wireless interface;
      establish a second connection to a mobile station within a wireless coverage area of the relay station through the wireless interface according to a second a protocol stack comprising convergence, MAC and PHY layers;
      perform a second ARQ process for the second connection between the relay station and the mobile station through the wireless interface; and
      forward, during a handover of the mobile station from the relay station to a target station, context information associated with at least the second protocol stack to enable continuity of data flow for the mobile station at the target station.

13. The relay station of claim 12, wherein the relay station is one of:
   a mobile relay station; or
   a fixed relay station.

14. The relay station of claim 12, further comprising memory associated with the control system;
   wherein the control system comprises one or more of:
      one or more central processing units executing instructions stored in the memory;
      one or more application specific integrated circuits; or
      one or more programmable field arrays.

15. The relay station of claim 12, wherein the relay station is configured to serve a plurality of mobile stations, including the mobile station, within the wireless coverage area of the relay station, and the first connection is a transport connection for downlink data for the plurality of mobile stations;
   wherein the control system is configured to maintain, through the wireless interface, a plurality of second connections, including the second connection, to the plurality of mobile stations, wherein each of the plurality of second connections is for one of the plurality of mobile stations, and wherein at least some of the plurality of second connections are ARQ enabled.

16. The relay station of claim 15, wherein the control system is configured to maintain, through the wireless interface, a separate ARQ process for each of the plurality of second connections that is ARQ enabled.

17. The relay station of claim 12, wherein the target station is the base station, wherein the control system is configured to forward, through the wireless interface, the context information to the base station for the second ARQ process, responsive to initiation of the handover of the mobile station from the relay station to the base station;
   wherein the second ARQ process with the mobile station is continued by the base station, responsive to the control system forwarding the context information to the base station for the second ARQ process.

18. The relay station of claim 12, wherein the target station is a second relay station that is associated with the base station and operates in an end-to-end ARQ mode, wherein the control system is configured to forward, through the at least one wireless interface, the context information to the base station for the second ARQ process, responsive to initiation of the handover of the mobile station from the relay station to the second relay station;
   wherein the second ARQ process with the mobile station is continued by the base station in an end-to-end manner via the second relay station, responsive to the control system forwarding the context information to the base station for the second ARQ process.

19. The relay station of claim 12, wherein the target station is a second relay station that is associated with the base station and operates in a distributed ARQ mode, wherein the control system is configured to forward, through the wireless interface, the context information to the base station for the second ARQ process, responsive to initiation of the handover of the mobile station from the relay station to the second relay station;
   wherein the context information is forwarded to the second relay station by the base station for the second ARQ process, responsive to the control system forwarding the context information to the base station for the second ARQ process; and wherein the second ARQ process with the mobile station is continued by the second relay station, responsive to the context information being forwarded by the base station to the second relay station for the second ARQ process.

20. The relay station of claim 12, wherein the target station is a second base station, wherein the control system is configured to forward, through the wireless interface, the context information to the base station for the second ARQ process, responsive to initiation of the handover of the mobile station from the relay station to the second base station;

wherein the context information is forwarded to the second base station by the base station for the second ARQ process, responsive to the control system forwarding the context information to the base station for the second ARQ process; and wherein the second ARQ process with the mobile station is continued by the second base station, responsive to the context information being forwarded to the second base station by the base station for the second ARQ process.

21. The relay station of claim 12, wherein the target station is a second relay station that is associated with a second base station and operates in an end-to-end ARQ mode, wherein the control system is configured to forward, through the wireless interface, the context information to the base station for the second ARQ process, responsive to initiation of the handover of the mobile station from the relay station to the second relay station;

wherein the context information is forwarded to the second base station by the base station for the second ARQ process, responsive to the control system forwarding the context information to the base station for the second ARQ process; and wherein the second ARQ process with the mobile station is continued by the second base station in an end-to-end manner via the second relay station, responsive to the context information being forwarded by the base station to the second base station for the second ARQ process.

22. The relay station of claim 12, wherein the target station is a second relay station that is associated with a second base station and operates in a distributed ARQ mode, wherein the control system is configured to forward, through the wireless interface, the context information to the base station for the second ARQ process, responsive to initiation of the handover of the mobile station from the relay station to the second relay station;

wherein the ARQ context information is forwarded to the second relay station by the base station for the second ARQ process, responsive to the control system forwarding the context information to the base station for the second ARQ process; and wherein the second ARQ process with the mobile station is continued by the second relay station, responsive to the context information being forwarded by the base station to the second relay station for the second ARQ process.

* * * * *